United States Patent [19]

Morishita et al.

[11] 4,334,238

[45] Jun. 8, 1982

[54] COLOR IMAGE PICKUP APPARATUS WITH MULTI-SOLID-STATE IMAGE PICKUP DEVICES

[75] Inventors: Masanobu Morishita; Takanori Tanaka, both of Tokyo, Japan

[73] Assignee: Nippon Electric Co., Ltd., Tokyo, Japan

[21] Appl. No.: 153,163

[22] Filed: May 27, 1980

[30] Foreign Application Priority Data

Jun. 1, 1979 [JP] Japan .................................. 54-69093

[51] Int. Cl.$^3$ ............................................. H04N 9/07
[52] U.S. Cl. .................................................... 358/43
[58] Field of Search ....................... 358/43, 50, 52, 44, 358/213

[56] References Cited

U.S. PATENT DOCUMENTS 3,739,079 6/1973 Noda et al. ........................... 358/43

*Primary Examiner*—John C. Martin
*Attorney, Agent, or Firm*—Laff, Whitesel, Conte & Saret

[57] ABSTRACT

A solid state, color image pickup apparatus separates incident light into three light beams, which diverge in three directions, to form three separate images. Two solid state image pickup devices correspond to a first and a second of the three images formed by the separated light beams. The two object images are a luminance light or a green light image, each having a first spectro-characteristic requiring a high visible resolution. The two solid state image pickup devices receiving the first and second images are displaced away from each other, by a distance in a row direction corresponding to ½ of the distance between adjacent picture elements, as viewed in the row direction. A color filter is located at the position of a third object image. The color filter includes cyclically recurring optical filters having a second spectro-characteristic (a blue light characteristic). Neither of these characteristics requires a high visible resolution. Another solid state image pickup device is illuminated with the object image, transmitted through the color filter in order to produce two separate images, depending upon the positions of the color filters.

14 Claims, 17 Drawing Figures

COLOR IMAGE PICKUP APPARATUS WITH MULTI-SOLID-STATE IMAGE PICKUP DEVICES

The present invention relates to a solid state color image pickup apparatus, with three solid state image pickup devices, which may pickup a color image with a higher resolution than was possible with the three picture elements contained in a conventional single solid state image pickup device.

In a conventional color image pickup apparatus, the incident light is separated into red, green and blue by means of a three-color beamsplitter. Three image pickup devices, such as pickup tubes, are disposed at positions corresponding to the respective color images. These tubes convert those three colors into corresponding color signals, which together form a color television signal. When this type of color image pickup apparatus is constructed from a solid state image pickup device, such as CCD (charge coupled device) image pickup devices, the resolution of a picture image depends on the number of solid state picture elements which are contained in the solid state image pickup device. The solid state image pickup devices which are currently available are insufficient to meet the requirement for the resolution of the color image pickup apparatus for a broadcasting or an industrial television system, which requires a high resolution of a picture image.

A system to obtain a color picture image with a high resolution by using the solid state image pickup devices with the insufficient number of picture elements has been described by Shigeo Komuro et al. in their paper entitled "A scheme of a 3 CCD Color Camera (Technical Report in the Institute of Television Engineers of Japan, TBS46-3 (May 25, 1978))". In this paper, three solid state image pickup devices are used, corresponding to three primary color images of red, green and blue, emanating from the three-color beamsplitter. The image pickup device for the color green is displaced from the image pickup devices for the colors red and blue with respect to the images, by one half of an image interval between the adjacent picture elements, as viewed in the row (horizontal) direction. This arrangement increases the apparent number of picture elements for the achromatic color. This approach can, accordingly, improve the resolution of the achromatic color image. However, the resolution for the monochromatic color image is merely determined by the number of picture elements contained in one solid state image pickup device. The displacement of the ½ interval between the green image pickup device and the red and blue image pickup devices frequently causes a failure of color registration at the boundaries between differently colored areas in an image. This phenomena is unavoidable in the Komuro et al. camera.

Accordingly, an object of the present invention is to provide a solid state color image pickup apparatus which can provide a color picture image with a high resolution, even if the number of the picture elements of the solid state image pickup devices is insufficient.

Another object of the present invention is to provide a solid state color image pickup apparatus which can also provide a high resolution, without the failure of color registration even, for a monochromatic image.

According to the present invention, a solid state color image pickup apparatus includes an image separating optical system, for separating an incident light into three light beams. These three beams are projected in three directions so as to form three images of the object, in the respective optical paths for the light beams. Two solid state image pickup devices correspond to at least two images of the three images formed by the light beams of the image separating optical system. These two object images are a luminance light image or a green light image, each having a first spectro-characteristic requiring a high visible resolution. A color filter is located at the position of another object image which is different from the two object images. The color filter has a plurality of optical filters arranged alternately in the row direction, the optical filters having a second spectro-characteristic (red light characteristic) and a third spectro-characteristic (blue light characteristic) neither of which require a high visible resolution. Another solid state image pickup device is illuminated with the object image transmitted through the color filter. The positions of the respective picture elements of the two solid state image pickup devices, corresponding to the two object images having the first spectro-characteristic with respect to the object images, are displaced from each other in the two solid state image pickup devices by a distance (in a row direction) corresponding to ½ of the interval of the adjacent picture elements.

As mentioned above, according to the invention, the solid state image pickup apparatus has the two solid state image pickup devices disposed corresponding to the object images having the first spectro-characteristic requiring a high visual resolution. The picture elements of the two solid state image pickup devices are displaced from each other (in the row direction) by one half of the interval between the adjacent picture elements. With this arrangement, the high visual resolution of the object image is ensured. With respect to the picture elements of the remaining one solid state image pickup device, the corresponding picture elements are secured by the two solid state image pickup devices, so that the color registration is satisfied.

In other words, the present invention positively takes advantage of a feature of NTSC, PAL, or SECAM color television system in which the frequency band width of the color signal is below 1.5 MHz and the band width of the luminance signal is in the order of 5 MHz. According to the invention, the relative phases of the primary three color signals are coincident with one another, thus eliminating the failure of color registration. Those color signals are converted into a color television signal by the usual color encoded, so that a high resolution is ensured even for a monochromatic image.

The above and further object, features and advantages of the present invention will become more apparent from the following description taken in connection with the accompanying drawings; wherein.

Figure 7A:
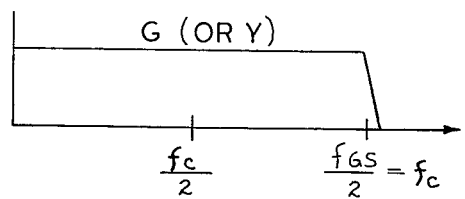
Figure 7B:
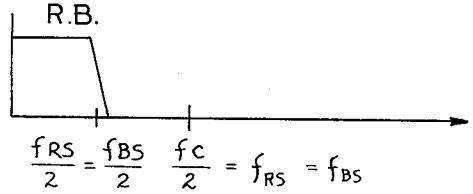
Figure 5:
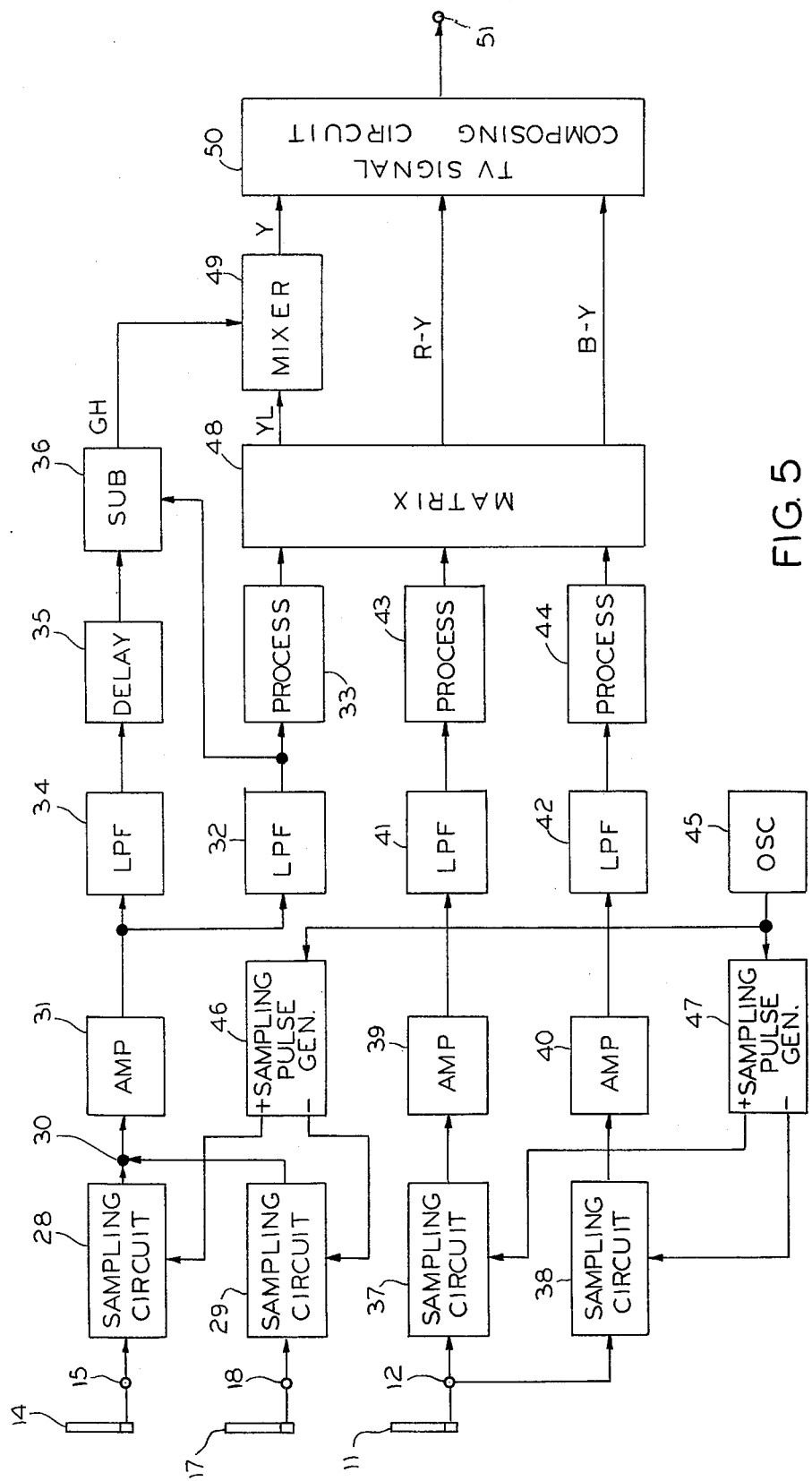
FIG. 5 is a block diagram illustrating an embodiment of a circuit construction of the solid state image pickup apparatus, according to the present invention.

FIGS. 6(a) to (j) are waveforms for illustrating phase relationships among the output signals from the respective solid state image pickup devices, video signals and sample pulses, which waveforms are useful in explaining the operations of the circuit shown in FIG. 5; and FIGS. 7(a) and 7(b) are graphical representations for explaining theoretical limits of the frequency bandwidths of three video signals of the color image pickup apparatus according to the embodiment of the present invention.

Figure 1:
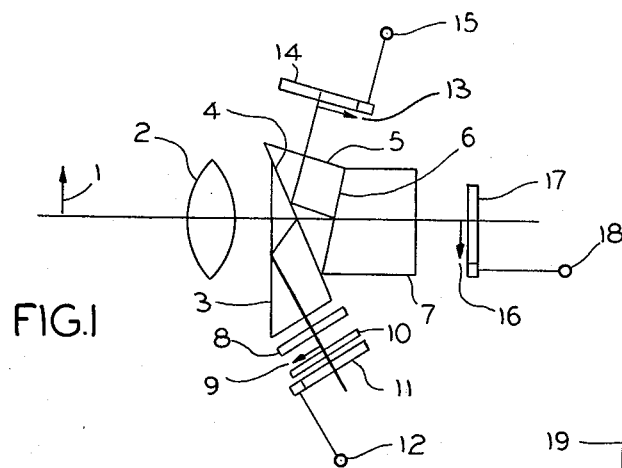
FIG. 1 is a schematic diagram illustrating an embodiment of a three-plate type color image pickup apparatus according to the present invention.

FIG. 1 shows an optical system in an embodiment having a three-plate type, solid state, color image pickup apparatus according to the present invention. In the optical system in the figure, an object 1 is imaged into three optical images 9, 13 and 16, through a lens 2 and a beamsplitter consisting of first to third prism blocks 3, 5 and 7.

The green color contained in the light beam incident into the first prism block 3 is transmitted through a boundary surface 4 between the first and second prism blocks 3 and 5 while the red and blue colors are reflected from the boundary surface 4. The light beam which is reflected by the surface 4 is fully reflected at the front surface of the prism block 3 and is imaged as an object image 9, through an optical low-pass filter 8. The optical filter 8 prevents spurious signals from being produced by a solid state image pickup device 11 when the light beam is converted into an electric signal.

Reference numeral 10 designates a color filter having many section arranged in such a way that these sections individually transmit red and blue colors for the respective individual picture element. The color filter 10 is disposed closest to the opto-electric converting surface of the solid state image pickup device 11. In FIG. 1, the image 9 is illustrated as being separated from the opto-electric converting surface of the solid state image pickup device 11; however, the image 9 is actually formed on the opto-electric converting surface.

Figure 4:
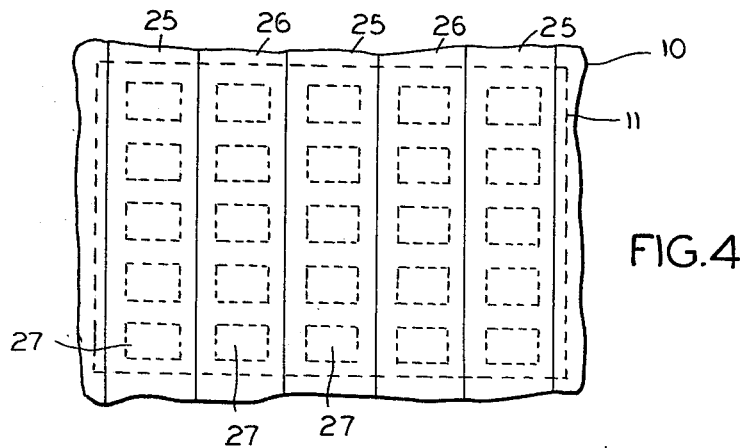
FIG. 4 is a plan view illustrating a part of the combination of a solid state image pickup device and a color filter corresponding to the second and third spectro-characteristics which do not require a high resolution in order to explain the relationship of positions between the solid state image pickup device and the color filter.

An example of an arrangement of the color filter 10 and the respective picture elements of the solid state image pickup device 11 is illustrated in FIG. 4. In FIG. 4, the color filter 10 is the combination of a filter 25, for transmitting the red light therethrough, and a filter 26, for transmitting the blue light therethrough. These two color filters are alternately arranged in the row direction, in the form of vertical stripes, at intervals, each corresponding to the intervals between the adjacent picture elements. The vertical center of each picture elements 27 of the solid state image pickup device 11 is positioned at the vertical center of each filter element 25 and 26, as shown.

Briefly, in review, FIG. 4 shows a solid state image pickup apparatus constructed on a single semiconductor chip. Cyclically repeated strip filters 25 transmit lignht with a red spectro-characteristic and, alternating therewith, cyclically repeated strip filters 26 transmit light with a blue spectro-characteristic. These filters may overlap each other, with picture elements responding to the red and blue images being alternately disposed. The picture elements under red filters 25 may be thought of as one solid state image pickup device and the picture elements under the blue filters 26 may be thought of as another solid state image pickup device, with both of these pickup devices being constructed on a single semiconductor chip.

Figure 2:
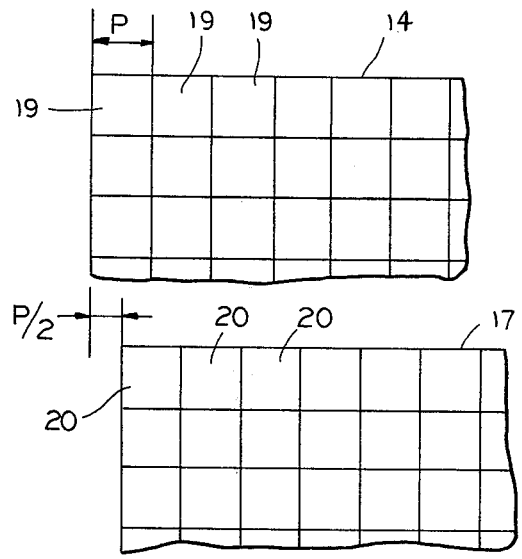
FIG. 2 illustrates the relative positions between two solid state image pickup devices which are disposed at positions corresponding to two object images having the first spectro-characteristic and requiring a high resolution.

The green light (requiring a high visible resolution) passes through the boundary surface 4 between the first and second prism blocks 3 and 5, and then is equally divided into a transmission light and a reflecting light at the boundary surface 6 between the second and a third prism blocks 5 and 7. The light reflected from surface 6 is also totally reflected at the boundary surface 4, to be imaged as an object image 13 on the opto-electric converting surface of the solid state image pickup device 14. On the other hand, the light transmitted through the boundary surface 6 is imaged on the opto-electric converting surface of the solid state image pickup device 17, as an object image 16. Those images 13 and 16 are of course green images. The relationship of the relative positions of the solid state image pickup device 14 with respect to the object image 13 and the solid state image pickup device 17 with respect to the object image 16 are illustrated in FIG. 2. It is assumed that the images 13 and 16 are identical because both of them are the green images. On this assumption, the solid state image pickup devices 14 and 17 are physically arranged in such a manner that the image 13 falls upon the solid image pickup device 14 at a position which is displaced from the position where the image 16 falls upon the image pickup device 17, by ½ of an interval P. The interval P is the distance between the centers of the adjacent picture elements 19, 19 or 20, as measured in the row direction across the surface of the pickup device.

With this arrangement of those solid state image pickup devices 14 and 17, having the mutual displacement of ½ of the interval P, the number of the picture elements for picking up the green light image is effectively doubled. For the interline transfer type of image pickup device using a charge coupled device (CCD) shown in FIG. 3, the equivalent increment of the picture element is further enhanced.

Figure 3:
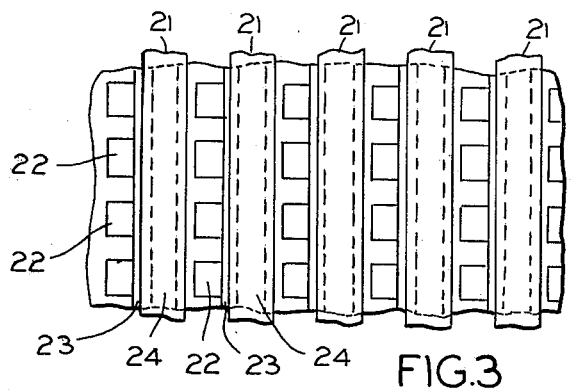
FIG. 3 is a schematic diagram illustrating a part of an interline transfer type of charge coupled transfer image pickup device.

As illustrated in FIG. 3, the interline transfer type CCD image pickup device provides light receiving portions 22 on the right sides (as viewed in the drawing) with transfer channels 24, for transferring charges vertically. These transfer channels 24 are covered with light shielding members 21 for shielding the transfer channels 24 from the incident light. Accordingly, on the interline transfer type of charge transfer device, the portions which are sensitive and insensitive to the light are alternately arranged in the row direction.

With this arrangement, the sensitive area ratio can not be 100%. When such a solid state pickup device is used, in the color image pickup device of our invention, the image projected onto the light-shielding portion 21 of one of the solid state image pickup device 14, 17 is also projected onto the light receiving portion 22 of the other of these solid state image pickup device and detected thereby. This feature is very convenient for increasing the resolution of the picture.

It is well known that, as the sensitive area ratio becomes smaller, a spurious signal for the object image with a high space frequency is increased remarkably. Assume now that the sensitive area ratio of the solid state image pickup device is 50%, and that the solid state image pickup components are disposed as shown in FIGS. 1 and 2, according to our invention. The light incident to the light-shielding portion of one solid state image pickup device is detected by the light receiving portion of the other solid-state image pickup device.

This means that, together, the two image pickup devices equivalently form an image pickup device with a sensitive area ratio of 100%. As a result, in addition to the increase in the number of the picture elements, the sensitive area ratio is increased, to reduce the occurrences of the spurious signals, remarkably.

At this time, it may be a problem that the sensitivity of the color camera is also reduced, since the green light is equally divided between pickups 14 and 17. However, the amount of the green light is generally larger than that of either the red light or the blue light. For this reason, an ND filter is inserted in the optical path of the green light for the purpose of balancing the amounts of the lights, that is to say, the green light is not utilized fully. Therefore, the half-divided green light, like the present invention, requires no ND filter and improves the light utility with little reduction of the camera sensitivity.

An embodiment where a color image pickup apparatus is constructed according to FIGS. 1 through 4, will be described next with reference to FIG. 5. In this figure, solid state image pickup devices 11, 14 and 17 are those designated by like reference numerals in FIG. 1. Each of the solid state image pickup devices 11, 14 and 17 has 380 picture elements arranged in the row direction. The clock frequency in the row direction is about 7 MHz for deriving a signal in conformity with the NTSC color television system. Hereinafter, the description will procede under this limited condition.

Figure 6:
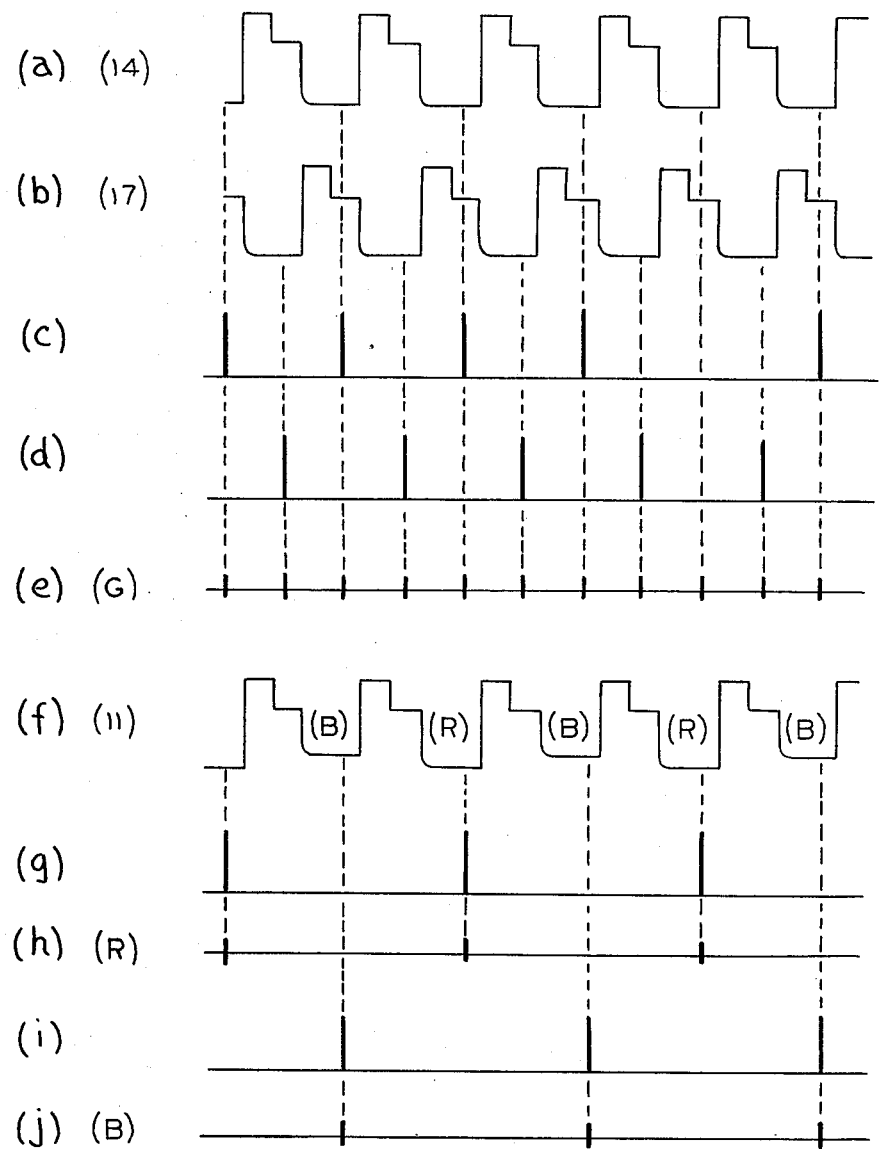

With respect to the green signals, the solid state image pickup devices 14 and 17 receive the green signals and produce corresponding electrical signals, shown in FIGS. 6(a) and 6(b), at the output signal terminals 15 and 18. As shown in FIG. 6, those signals are 180° out of phase each other. Those two signals are sampled by sampling circuits 28,29 and are mixed at an output point 30, and the mixed signal is applied to an amplifier 31. The sampling pulses are formed by a green signal sampling pulse generator 46 which properly process a signal received from an oscillator 45. The two sampling pulses, thus formed, have an out-of-phase relation and the phases are selected to sample the portions representing the intensities of the incident light of the signals shown in FIGS. 6(a) and 6(b). The sampling pulse for sampling the output signal from the solid state image pickup device 14 is shown in FIG. 6(c). The sampling pulse for sampling the output signal from the solid state image pickup device 17 is shown in FIG. 6(d). The green signal transmitted to the amplifier 31 is shown in FIG. 6(e). The frequencies of the sampling pulses shown in FIGS. 6(c) and 6(d) are both 7 MHz, so that the green signal shown in FIG. 6(e) becomes a video signal having the sampling frequency of 14 MHz. Accordingly, the green signal with 7 MHz for the video frequency band is obtained, theoretically.

The signal from the solid state image pickup device 11, obtained at the output terminal 12, has a waveform in which red and blue signals are alternately arranged, as shown in FIG. 6(f). The signal is sampled responsive to sampling circuits 37 and 38 in order to be separated into red and blue signals. The sampling pulses used in these sampling circuits 37 and 38 are out of phase with each other. The sampling pulse applied to the sampling circuit 37 is a signal as shown in FIG. 6(g), while the sampling pulse applied to the sampling circuit 38 is a signal as shown in FIG. 6(i). With those sampling pulses, the output signal from the sampling circuit 37 becomes a signal as shown in FIG. 6(h) which is a red video signal applied to an amplifier 39. The output signal from the sampling circuit 38 becomes a signal as shown in FIG. 6(j) which is a blue video signal applied to an amplifier 40. Each of those red and blue signals is a video signal with a 3.5 MHz sampling frequency so that the video frequency band of the two signal is theoretically 1.75 MHz.

The red signal produced from the amplifier 38 is applied to a matrix circuit 48 via a low-pass filter 41 (with a 1.7 MHz for the cut-off frequency) and a process amplifier 43 including a gamma compensating circuit, a black clip circuit, and so on. The blue signal produced from the amplifier 40 is also applied to matrix circuit 48 via a low-pass filter 42 (with a 1.7 MHz for the cut-off frequency) and a process amplifier 44.

One part of the green signal from the amplifier 31 is transferred to the matrix circuit 48, via a low-pass filter 42 (with a 1.7 MHz cut off frequency) and a process amplifier 33. The other part of the green signal is applied to a subtractor 36, via a low pass filter 34 of a 7 MHz cut-off frequency and a delay line 35. The delay line 35 is used for making the phases of the two signals from the low-pass filters 32 and 34 coincident with each other in the subtractor 36. The subtractor 36 subtracts the green signal with the narrow band width (1.7 MHz), which is the output signal from the low-pass filter 32, from the green signal with a wide band-width (7 MHz), which is the output signal from the delay line 35.

The output signal from the subtractor 36 constitutes a high frequency component (1.7 MHz to 7 MHz) of the green signal and this signal is used as a high frequency component of the luminance signal. The matrix circuit 48 composes a luminance signal $Y_L$ from a low frequency and two kinds of color difference signals (R-Y) and (B-Y). A signal from the subtractor 36 and the low frequency component luminance signal $Y_L$ from the matrix circuit 48 are mixed in a mixer 49, thereby composing a luminance signal Y having a wide frequency band. The luminance signal Y, and two kinds of the color difference signals (R-Y) and (B-Y), are formed into a color television signal at an output terminal 51, responsive to a color television signal composing circuit 50.

FIG. 7(a) illustrates a theoretical limit of a video frequency band obtained from the output of the amplifier 31 by the solid state image pickup devices 14, 17. FIG. 7(b) illustrates a theoretical limit of a video frequency band obtained by the solid state image pickup device 11 at the output of the amplifier 39 or 40. In FIG. 7, $f_c$ designates a clock frequency of 7 MHz (in the row direction) for driving each of the solid state image pickup devices 11, 14 and 17. The symbol $f_{GS}$ designates the sampling frequency of 14 MHz for the green signal. The symbols $f_{RS}$ and $f_{BS}$ are sampling frequencies of 3.5 MHz, for sampling the red and blue signals.

As described above, the frequency band of the luminance signal, obtained by the color image pickup apparatus according to the present invention, is expanded to corresponding to the number of picture elements which is two times the number of picture elements contained in the solid state image pickup device in the row direction. Also, the expanded frequency band is four times greater than the frequency band of the color signal. When the number of picture elements in the row direction is in the order of 380, the frequency band of the luminance signal is 7 MHz and the frequency band of the color signal is 1.7 MHz. The width of the video frequency band is sufficient for a color camera of the standard color television systems, such as the NTSC, PAL, or SECAM systems and the like. Thus, the present invention may provide a solid state color image pickup apparatus by using three solid state image pickup devices, each having a few picture elements arranged in the row direction.

The present invention is not limited to the embodiment described above. For example, the spectro-optical system may provide a color image pickup apparatus with a high resolution if the reflecting and transmitting characteristics, at the boundary surfaces 4 in the three-color beamsplitter of FIG. 1, are flat over the entire range of visible rays. In this modification, the solid state image pickup devices 14 and 17 are arranged to produce electric signals corresponding to the luminance light having the luminance information, not the green light. The characteristic shown in FIG. 7(a) indicates the characteristic of the luminance signal Y, in this case.

It is needless to say that, for the above modification, a minor change is required in the circuit illustrated in block form in FIG. 5. In such a change, the output signal from the process circuit 33 constitutes a low frequency component of the luminance signal. Therefore, matrix circuit 48 may be made simple and the output signal from the process circuit 33 can be directly applied to the mixer 49. The color difference signal R-Y may be obtained by subtracting the output signal of the process circuit 33 from the output signal from the process circuit 43. The color difference signal B-Y may be similarly obtained by subtracting the output signal of the process circuit 33 from that of the process circuit 44. The remaining portions in the modified circuit may be the same as those shown in FIG. 5.

The spectro-optical system shown in FIG. 1 may be a relay lens and mirror system, in place of the beamsplitter composed of three prisms. Further, the solid state image pickup device is not limited to the interline transfer type CCD device, and may be a frame transfer type CCD device or a MOS sensor.

The color filter is not limited to the longitudinal stripe filter shown in FIG. 4, and may be a mosaic filter. The width of each element of the color filter in the row direction may be any width so long as the two solid state image pickup devices corresponding to the first spectro-characteristic are shifted by the half-picture element pitch, and not exactly equal to the one picture element pitch.

In FIG. 5 and FIGS. 6(a) and 6(b), the output signals from the two solid state image pickup devices are illustrated as being out-of-phase by 180° from each other. In this case, the phases of the drive signals applied to the two solid state image pickup devices 14 and 17 must be different from each other. Additionally, the two solid state image pickup devices can not be driven by a single drive amplifier, acting alone. However, such a drive amplifier may be commonly used for both of the pickup devices when used with a delay line having a delay corresponding to ½ picture element. The delay line is inserted between the output terminal 18 and the sampling circuit 29.

What is claimed is:

1. A solid state color image pickup apparatus comprising:
   image separating optical means for separating an incident light of an object into a plurality of light beams diverging in a plurality of directions to form images of said object in the corresponding optical paths of said light beams;
   a plurality of solid state image pickup means, each of said pickup means having a plurality of picture elements displaced from each other by a predetermined distance;
   first and second of said solid state image pickup means being disposed to separately receive at least two individually associated ones of said images formed by said diverging light beams, said two images having a first spectro-characteristic requiring a high visible resolution, the relative positions of the picture elements and the received image being displaced between said first and second solid state image pickup means by a distance corresponding to a half of said predetermined distance; and
   a third of said solid state image pickup means being disposed to receive another image formed by said diverging light beams and having a second spectro-characteristic.

2. The solid state image pickup apparatus claimed in claim 1, wherein said image with said second spectro-characteristic includes first and second color information of said object, said third pickup means having a first group of picture elements responsive to said first color information and a second group of picture elements responsive to said second color information and being constructed on a single semiconductor chip in a manner such that said first and second groups of picture elements are alternately disposed to receive said first and second color information.

3. The solid state image pickup apparatus claimed in claim 2, wherein said first spectro-characteristic enables a transmission of green light, which said first color information is red light information and said second color information is blue light information.

4. The solid state image pickup apparatus claimed in claim 3 wherein said first, second and third solid state image pickup means have charge transfer areas arranged in parallel with columns of picture elements, said picture elements being made of photosensitive elements.

5. The solid state image pickup apparatus claimed in claim 3 wherein said picture elements of said first and second groups include optical filters transmitting said first color information and said second color information, respectively.

6. The solid state image pickup apparatus claimed in claim 1 or 2 wherein said first, second and third solid state image pickup means have charge transfer areas arranged in parallel with columns of picture elements, said picture elements being made of photosensitive elements.

7. The solid state image pickup apparatus claimed in claim 6 wherein said picture elements of said first and second groups include optical filters transmitting said first color information and said second color information, respectively.

8. The solid state image pickup apparatus claimed in claim 2, wherein said first spectro-characteristic enables a transmission of luminance light having luminance information, said second spectro-characteristic enables a transmission of red and blue light.

9. The solid state image pickup apparatus claimed in claim 2 wherein said picture elements of said first group and said picture elements of said second group include color filters for transmitting said first color information and said second color information, respectively.

10. The solid state image pickup apparatus claimed in claim 1, wherein said first spectro-characteristic enables a transmission of green light, said second spectro-characteristic including first color information relating to red light information and second color information relating to blue light information.

11. The solid state image pickup apparatus claimed in claim 1 wherein said first spectro-characteristic enables a transmission of luminance light having luminance information, said second spectro-characteristic enables a transmission of red light and blue light.

12. A solid state image pickup apparatus comprising:
an image separating optical system means for separating an incident light into three light beams, with said beams being deflected in three individually associated directions to form three object images in the corresponding optical paths for said light beams;
two solid state image pickup means disposed at positions corresponding to two images of said three object images formed by said light beams separated by said image separating optical system means, said two object images having a first spectro-characteristic requiring a high visible resolution, each of said pickup means having a plurality of picture elements arranged in rows and columns, the relative positions of the picture elements and the received image being displaced between said first and second solid state image pickup means by a distance corresponding to about a half of the distance between adjacent picture element in the row direction;
color filter means located at the position of another object image which is different from said two object images and having optical filters which are alternately arranged in the row direction, said optical filters having second spectro-characteristics and third specro-characteristics, respectively, neither of which requires a high visible resolution; and
third solid state image pickup means illuminated with the object image transmitted through said color filter.

13. The solid state image pickup apparatus according to claim 12, wherein said first spectro-characteristic enables a transmission of green light, said second spectro-characteristic enables a transmission of red light, and said third spectro-characteristic enables a transmission of blue light.

14. The solid state image pickup apparatus claimed in claim 12 wherein said first spectro-characteristic enables a transmission of luminance light having luminance information, and said second and third spectro-characteristics of said color filter means enable transmission of red light and blue light, respectively.

* * * * *

UNITED STATES PATENT AND TRADEMARK OFFICE
CERTIFICATE OF CORRECTION

PATENT NO. : 4,334,238
DATED : June 8, 1982
INVENTOR(S) : MORISHITA, et al.

It is certified that error appears in the above—identified patent and that said Letters Patent is hereby corrected as shown below:

Col. 1, Line 18, begin a new paragraph at "When";

Col. 1, Line 41, delete "with respect to the images";

Col. 2, Line 4, delete "images" (first occurrence);

Col. 2, Line 48, change "encoded" to --encoder--;

Col. 3, Line 36, change "section" to --sections--;

Col. 5, Line 35, after "phase" insert --with--;

Col. 6, Line 8, "38" should be --39--;

Col. 7, Line 24, after "fore," insert --the--;

Col. 8, Line 34, "which" should be --while--.

Signed and Sealed this

Nineteenth Day of October 1982

[SEAL]

Attest:

GERALD J. MOSSINGHOFF

Attesting Officer

Commissioner of Patents and Trademarks